United States Patent [19]

Bhattacharyya

[11] 4,311,597

[45] * Jan. 19, 1982

[54] METHOD AND APPARATUS FOR TREATMENT OF WASTEWATER

[75] Inventor: Aniruddha Bhattacharyya, West Seneca, N.Y.

[73] Assignees: Republic Steel Corporation, Cleveland, Ohio; The Hanna Furnace Corporation, Buffalo, N.Y.

[*] Notice: The portion of the term of this patent subsequent to Jun. 2, 1998, has been disclaimed.

[21] Appl. No.: 13,679

[22] Filed: Feb. 21, 1979

[51] Int. Cl.³ .......................... C02F 3/12; B01D 3/38; C02F 1/10
[52] U.S. Cl. ..................................... 210/731; 210/743; 210/750; 210/904; 210/96.1; 203/7; 203/33; 203/79; 203/97; 55/70; 423/356
[58] Field of Search ................... 203/7, 10, 33, 36, 37, 203/85, 97, 79; 423/356, 357; 210/59, 60, DIG. 28, 18, 96.1; 55/70

[56] References Cited

U.S. PATENT DOCUMENTS

| | | | |
|---|---|---|---|
| 1,654,863 | 1/1928 | Cooper et al. | 203/33 |
| 2,199,767 | 5/1910 | Wells et al. | 210/18 |
| 3,278,423 | 10/1966 | Millar | 423/357 |
| 3,826,815 | 7/1974 | Maurovic | 423/356 |
| 4,061,718 | 12/1977 | Verlaeten et al. | 423/356 |
| 4,108,735 | 8/1978 | Burcaw, Jr. et al. | 423/357 |
| 4,111,759 | 9/1978 | Didycz et al. | 203/7 |
| 4,140,586 | 2/1979 | Kwasnoski et al. | 203/10 |

FOREIGN PATENT DOCUMENTS

| | | | |
|---|---|---|---|
| 1141267 | 8/1960 | Fed. Rep. of Germany | 423/356 |
| 176400 | 3/1922 | United Kingdom | 423/356 |
| 1070733 | 6/1967 | United Kingdom | 423/356 |

OTHER PUBLICATIONS

Wong-Chong, G. M., "Design and Operation of Biological Treatment for Coke Plant Wastewaters", Carnegie-Mellon Institute of Research; Sep. 9, 1978.
Adams, Jr., C. E.; "Treatment of a High Strength Phenolic and Ammonia Wastestream by Single and Multi-Stage Activated Sludge Processes"; Proc. of the 29th Ind. Waste Conf.; Purdue University; pp. 617–630 (1974).

Primary Examiner—Benoît Castel
Attorney, Agent, or Firm—Sandler & Greenblum

[57] ABSTRACT

A method of removing ammonia from a wastewater containing free and fixed ammonia said process comprising the steps of: distilling the wastewater to remove the free ammonia; treating the distilled wastewater with soda ash to decompose the fixed ammonia; and distilling the treated wastewater to remove the decomposed ammonia.

An apparatus for removing ammonia from a wastewater containing free and fixed ammonia comprising: an ammonia still for removing free and fixed ammonia; a source of soda ash solution; and means for feeding the soda ash solution from said soda ash source to the ammonia still to decompose the fixed ammonia.

26 Claims, 1 Drawing Figure

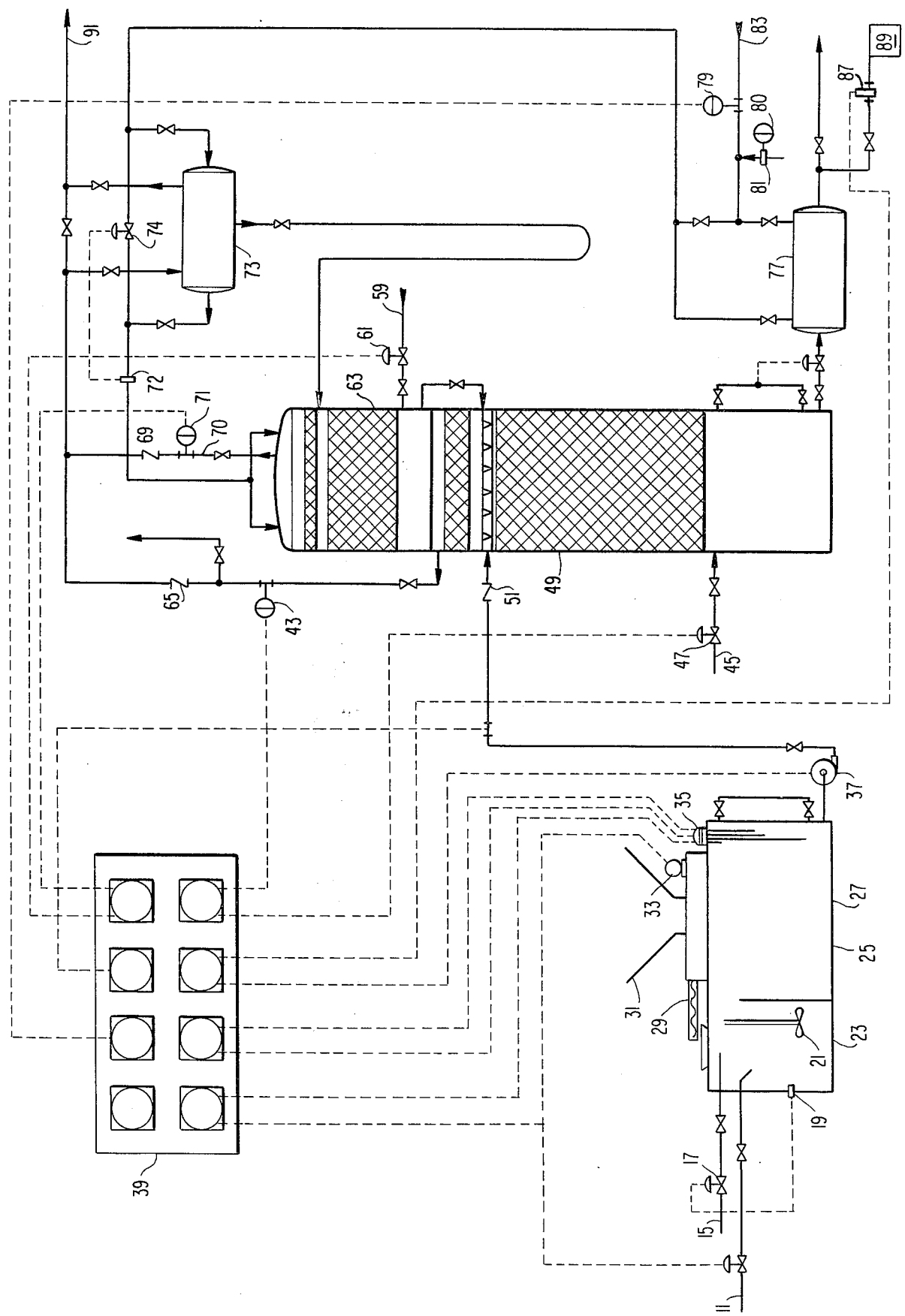

METHOD AND APPARATUS FOR TREATMENT OF WASTEWATER

BACKGROUND OF THE INVENTION

1. Field of the Invention

The invention relates to a method and apparatus for removing ammonia from wastewaters such as coke plant or coal conversion wastewaters and particularly raw ammonia liquors.

2. Description of Prior Art

Industrial effluents such as coke plant wastewaters often contain high levels of ammonia as well as phenols, cyanides, sulfides, thiocyanates, thiosulfates, and other compounds. In view of the fact that current federal regulations limit the amounts of ammonia and other compounds which may be discharged into bodies of water, numerous attempts at reducing pollutant content have been made.

With respect to coke plant wastewaters, ammonia removal has normally been achieved by means of a steam distillation process operated in conjunction with either lime or caustic addition.

Examples of previous treatment systems may, for example, be found in U.S. Pat. No. 3,278,423 to Millar which discloses a process for the treatment of aqueous crude effluent liquors from coal carbonizing plants. The process which comprises distilling the crude industrial liquor to first remove free ammonia. The partially treated effluent is next subjected to a biochemical oxidation step and is then treated by the addition of lime to convert fixed ammonia salts into free ammonia salts which may then be separated from the waste liquor by means of distillation.

While the addition of lime has indeed proven useful in converting fixed ammonia into free ammonia which may be liberated by means of distillation, such addition has resulted in fouling problems which have proven troublesome when the process is operated on an industrial scale. Thus, several attempts have been made to overcome fouling problems by means of the addition of scale inhibiting compounds.

U.S. Pat. No. 4,104,131 to Didycz et al. discloses a water purification process for the removal of ammonia from wastewaters such as coke plant or coal conversion wastewaters which comprises the addition of lime in amounts sufficient to react with fixed ammonia salts present in the wastewater. The patent discloses the addition of a scale inhibitor compound selected from the class of certain organic phosphonates. The process is conducted in essentially two steps. In the first step, the free ammonia is distilled out of the effluent. The fixed ammonia level is substantially reduced in a second distillation step performed on the wastewater after it has been treated with lime and scale inhibitor compounds.

U.S. Pat. No. 4,108,735 to Burcaw et al traces the history of the use of steam stills to remove ammonia from weak ammonia liquor generated during the coking of coal. In the conventional process, the liquor is first steam distilled in what is called a "free leg" to remove free ammonia and ammonia compounds. The once distilled weak ammonia liquor is then combined with an aqueous slurry of lime and then distilled in what is known as the "fixed" leg of the process where a direct counter current flow of steam distills the hydrated ammonia from the lime-liquor slurry. Both the free and fixed legs of the ammonia still comprise an upright column having internally disposed horizontal plates or trays. Each plate is equipped with gas-liquid contacting means through which ascending steam may pass. The gas-liquid contacting means are conventionally either trays comprising sieve holes or bubble cap assemblies. As the patent points out, a major drawback inherent in using a conventional ammonia still is the tendency of the distillation column to become plugged or fouled. This results because solid calcium compounds which do not dissolve but instead form a dispersion tend to accumulate in and around the gas-liquid contacting means thereby restricting and eventually interrupting or interfering with the flow of steam. Fouling is particularly a problem in the free leg of the still. Once fouling occurs the still must be dismantled and cleaned thus resulting in substantial down time and increased expense. Even prior to complete fouling of the system, by virtue of buildup within the still, the still necessarily operates at reduced efficiency. As a result, ammonia stills for the distillation of weak ammonia liquor derived from coal coking operations have traditionally been designed with an excess capacity so as to be able to withstand a certain degree of fouling.

The patent seeks to overcome the clogging problem normally encountered by subjecting the incoming weak ammonia liquor to a preliminary precipitation with calcium hydroxide prior to its entrance into the ammonia still. Thus, prior to entering the free leg of the system, the liquor is treated in a lime leg which results in the precipitation of insoluble calcium salts prior to distillation. Such pre-precipitation essentially reduces the fluoride and carbonate ion concentrations in the weak ammonia liquor to the point where their calcium salts will not precipitate during distillation and cause clogging. The patent discloses an alternative attempt at overcoming the clogging problem in referring to the addition of caustic soda prior to distillation. By virtue of this substitution, calcium ions which are normally associated with the clogging problem are eliminated from the still. Although such a substitution has been found satisfactory from the point of view of fouling, the cost of caustic soda may vary and can prove very expensive depending on market conditions.

Yet another problem inherent in conventional lime treatment processes is that lime, when added to the effluent, results in a colloidal solution. The solids formed when the lime contacts the waste liquor, make it virtually impossible to automatically control the process by means of sensors, automatic instrumentation, feedback control and the like, by virtue of the fact that the solids make accurate measurement of variables in the effluent impossible.

Furthermore, pH control is very difficult with lime systems since, once having been passed through the free leg of the system, the free ammonia is removed and the system is slightly acidic. Once alkali is added to the liquor, the pH jumps. In view of this swing in pH in the lime system, accurate feedback control of lime addition is extremely difficult.

Finally, although prior treatment processes have referred to the use of biological treatment steps, such treatments have been difficult to achieve in practice and have necessarily entailed extremely careful monitoring of the biological mass and has thus been very expensive. Furthermore, the use of calcium ions in the treated wastewater has severely hindered the addition of phosphates to the wastewater, such phosphates being necessary for an effective biological treatment. When calcium ions are present they will precipitate as calcium phosphate.

SUMMARY OF THE INVENTION

It is, therefore, an object of the invention to provide a treatment system for removing both free and fixed ammonia and ammonia compounds which is both economical and commercially feasible.

It is a further object of the invention to provide a process and apparatus which avoids fouling and plugging problems in the ammonia still thus reducing down time and expense.

It is a further object of the invention to provide a process and apparatus which, by virtue of the treatment process, can be easily and accurately monitored and controlled with a minimum of supervision to meet stringent government regulations relating to water pollution standards.

It is yet another object of the invention to provide a waste liquor treatment process which is highly compatible with a biological treatment of the steam distilled waste liquor.

These and other objects are fulfilled by means of the method of the invention which comprises removing ammonia from a wastewater containing free and fixed ammonia which process comprises the steps of: distilling the wastewater to remove the free ammonia; treating the distilled wastewater with soda ash to decompose the fixed ammonia; and distilling the treated wastewater to remove the decomposed ammonia.

In a preferred embodiment of the invention the wastewater treated comprises a raw ammonia liquor derived from a coal coking operation. Such a liquor comprises carbon dioxide, free cyanide compounds, oils and low boiling aromatic compounds, and the process of the invention comprises removing each of these additional compounds in the initial distillation step.

Yet another preferred aspect of the invention comprises performing each of the distillation steps of the invention in a packed distillation column. Preferably, the distillation is a low pressure steam distillation.

The soda ash is preferably fed to the distillation column in the form of an aqueous solution of $Na_2CO_3$ maintained as close as possible to saturation concentration. Thus, concentrations of 18-22% are normally used. Saturated solutions are preferred since the higher the soda ash concentration, the lower the steam consumption.

By virtue of the method of the invention the system may be accurately monitored by measuring the pH of the purified wastewater leaving the ammonia still and varying the amount of aqueous soda ash solution added to the wastewater so as to maintain the pH of the outgoing treated and purified wastewater at less than approximately 9.0. Most preferably the pH is maintained between 8.5 and 9 and it is most desirably maintained at approximately 8.6-8.7.

By virtue of the fact that soda ash is the treating agent used, it is possible to automatically maintain the pH at the desired level without the necessity of manual intervention.

Although the system may be further controlled by varying the pressure of the steam used in each of the distillation steps so as to maintain the pH of the purified and treated wastewater at the desired level, it is an advantage of the invention that steam pressure may be kept constant and the pH regulated solely by varying the soda ash feed.

In yet another preferred embodiment of the invention it has been found that by virtue of the addition of soda ash instead of conventional treatment additives such as lime, the system is unusually compatible with a subsequent biological treatment step which serves to further purify the wastewater.

The objects of the invention are further fulfilled by means of the apparatus of the invention which removes ammonia from wastewater containing free and fixed ammonia. The apparatus comprises an ammonia still for removing free and fixed ammonia and a source of soda ash solution. Means are provided for feeding the soda ash solution to the ammonia still to decompose the fixed ammonia.

In a preferred embodiment of the invention the ammonia still is a packed two stage distillation column.

A unique advantage of the apparatus is that means may be provided for measuring pH of the purified wastewater and using these measurements to accurately control the system variables.

Thus, control means may be provided for varying the feeding of the soda ash to the ammonia still, these control means being connected to the means for feeding the soda ash, and being adapted to vary the amount of soda ash being fed to the ammonia still so as to maintain the pH of the treated wastewater below approximately 9.0.

The source of soda ash solution preferably comprises a soda ash dissolution tank comprising 18-22% soda ash solution. The soda ash dissolution tank may further comprise a screw for conveying soda ash into the tank, a water inlet, and a steam inlet.

Most preferably, the apparatus may comprise automatic means connected to the control means for automatically varying the feeding of the soda ash to the still. The automatic means may additionally be adapted to automatically vary the amount of steam supplied to the ammonia still so as to maintain the pH of the purified wastewater below 9.0. However, most preferably the steam pressure is maintained constant within the still at 4-7 psig and only the soda ash feed is varied.

As was previously noted, the apparatus of the invention, by virtue of the fact that it comprises a source of soda ash solution connected to the ammonia still, may very efficaciously be used in conjunction with a downstream biological treatment means for further purifying the wastewater.

BRIEF DESCRIPTION OF DRAWINGS

With reference to the annexed drawings:
FIG. 1 illustrates one embodiment of the invention.

DESCRIPTION OF PREFERRED EMBODIMENTS

As illustrated, the invention is directed to a two stage ammonia still treatment for treating coke plant wastewaters to remove free and fixed ammonia and ammonia compounds. A significant feature of the invention is the use of soda ash solution in conjunction with a steam distillation process as a means for decomposing stable or fixed ammonium salts for the removal of ammonia from the wastes. It has been surprisingly found that the use of soda ash enables the process to be completely trouble free with no problems of clogging or the like permitting around the clock operation with fully automated control system.

As seen from FIG. 1, a raw ammonia containing liquor, such as coke wastewater, 81, is fed into a heat exchanger 77 where it is pre-heated by purified wastewater as it passes countercurrently through the heat exchanger. The composition of the wastewater fed by line 81 can vary and typically contains approximately 4000–5000 mg/liter of ammonia of which approximately 3500–4500 mg/liter are in the form of fixed ammonia. The input to the system may be varied and may additionally contain other wastes having varying ammonia concentrations resulting from the coke production process as well as other effluents such as those resulting from benzol absorption and stripping, final coke oven gas coolers, desulfurizers and the like, fed through line 83. The mix or ratio of the two feeds is adjusted by means of a waste flow controller 79 and a liquor controller 80. It should be noted that although coke plant wastewater is of primary interest, any of the recited effluents may be treated alone or in combination and the ratio adjusted as desired. The heated wastewater to be treated is then passed through heat exchanger 73, to the top of the two stage ammonia still which comprises free leg 63 in which "free" ammonia bearing compounds are distilled out of the wastewater together with oils, low boiling aromatics, cyanides and carbon dioxide. The still further comprises fixed leg 49 in which stable ammonium compounds are removed. A portion of the waste liquor to be treated may be diverted by means of valve 74 connected to a temperature controller 72 through heat exchanger 73 where it is countercurrently indirectly contacted with heated vapors leaving the fixed and free leg in order to control the still feed to a fixed preset temperature close to about 212° F.

As shown, the still comprises a packed tower made up of two stages. Vapors are removed separately from each stage so as to provide a source of high quality ammonia leaving the second stage. The incoming wastewater, as it falls downwardly within the packed column, counter currently contacts low pressure steam coming off of line 59 through pressure control valve 61 into the free leg 63. The steam is a low pressure steam having a pressure of approximately 10–12 psig although other pressures may quite obviously be used. Vapors leaving the fixed leg leave the system through line 70, a check valve 69 and heat exchanger 73 prior to being fed into coke oven gas line 91. Carbon dioxide, free cyanides and ammonium compounds are removed from the free leg through this line. Pressure is preferably maintained at approximately 4–7 psig within the packed column by means of pressure controllers 71.

After having been partially purified the stripped liquor flows from the free leg to the fixed leg through a liquid distributor tray and once again cascades downwardly and countercurrently to rising steam being fed from line 45 through check valve 47. It is in this stage that soda ash solution, preferably having a concentration of about 18–22%, is added through check valve 51. The amount of soda ash added is controlled by means of control panel 39 and is a function of the pH of the purified wastewater as it is sensed by pH control probe 87. A portion of the purified liquid may be sent to a sampler unit 89. It has been found preferable to maintain a pH of less than 9.0 in the effluent. Advantageously the pH is 8.5 to 9.0 and most preferably is between 8.6–8.7. By virtue of the fact that the system is relatively stable with respect to pH upon the addition of the $Na_2CO_3$, measurement of pH by probe 87 may accurately be used to control the addition of soda ash to the system. Also, since the soda ash added to the system helps to liberate or free ammonia compounds within the cascading liquid stream, rising steam removes decomposed previously stable ammonium compounds which may likewise be fed into the coke oven gas line 91. Pressure within the fixed leg of the system is maintained by means of pressure controller 43. By adjustment of check valve 65, a portion of the vapors leaving the fixed leg may be diverted and used in other ammonia related processes. Consistent with economical operation, each of the heat exchangers as well as the column itself are insulated to keep heat losses to a minimum. A key feature of this system is the soda ash dissolution tank 25 in which service water coming from line 11 is mixed with soda ash coming from feed bin 31 to form a solution of the desired concentration maintained constant prior to being fed to the fixed leg of the system. Soda ash, coming from feed bin 31 is delivered to the tank 25 by means of a feed screw 29. The screw is driven by means of motor 33. The ash is delivered into mixing section 13 of the tank maintained at constant liquid level where it is mixed with water and heated and agitated by low pressure steam fed through line 15. The amount of steam used is varied by means of control valve 17 as a function of the temperature within the tank as sensed by means of probe 19. The temperature of the soda ash solution is preferably maintained at approximately 140 degrees F. The mixture is agitated by means of propeller 21, although other means may be used, in the mixing section 23 of tank 25. The mixed liquid passes over a weir and into the feed section 27 of the tank prior to being pumped into the fixed leg by means of pump 37 regulated as a function of the pH sensed by sensor 87. The level of solution within the tank is variable and is controlled by means of control 35 which senses the liquid level and is connected to panel 39. The concentration of the soda ash solution may be varied by regulating the amount of water added through line 11 as well as the amount of soda ash added to the system by means of screw 29. Preferably the solution is maintained at a concentration of approximately 18–22% as closely as possible approaching saturation concentration.

It may be seen from the above description that the invention lends itself to complete automation by virtue of control panel 39 which was not the case in previous caustic and lime systems. Such automation is possible by virtue of the precise pH control made possible when using soda ash in the fixed leg of the still.

Likewise, by virtue of the minimal clogging problems which result when soda ash is used, it is possible to use a packed column instead of the conventional tray or bubble cap type column which had been previously necessary when dealing with lime. Such a system makes it possible to operate at extremely high contact efficiencies and thus results in minimal steam consumption. Thus, by virtue of the process and apparatus used, it has been found that steam consumption may be kept down to as low as 1.2 pounds per gallon of feed wastewater and even lower. The process of the invention thus successfully minimizes the amount of energy necessary to generate the steam required.

Finally, by virtue of the use of soda ash in the fixed leg, the purified wastewater is highly compatible with a subsequent bacteriological treatment.

It should be noted that by virtue of the use of soda ash instead of lime, other compounds such as phosphates necessary to obtain desired bacterial growth may be present or added to the treated wastewater prior to the bacteriological treatment. Furthermore, soda ash acts as a carbon source for autotropic bacteria for the decomposition of thiosulfates, thiocyanates and left over ammonia.

The invention has been described with respect to particular preferred embodiments. It is to be understood, however, that the method of the invention is not limited to the particular apparatus disclosed and that the apparatus of the invention may be used in ways other than the method specifically disclosed without departing from the scope of the invention.

What is claimed is:

1. A method for removing ammonia from a wastewater containing free and fixed ammonia said process comprising the steps of:
    (a) distilling said wastewater to remove said free ammonia;
    (b) treating said wastewater of step (a) by adding an 18–22% aqueous soda ash solution thereto to decompose said fixed ammonia; and
    (c) distilling said treated wastewater of step (b) in a packed column to remove said fixed ammonia.

2. The method as defined by claim 1 wherein said wastewater is a raw ammonia liquor derived from a coal coking operation.

3. The method as defined by claim 2 wherein said wastewater is an effluent from a benzol production and stripping process, final coke oven gas coolers, desulfurizers or the like.

4. The method as defined by claim 2 wherein said raw ammonia liquor further comprises carbon dioxide, free cyanide compounds, oils and low boiling aromatic compounds, and said process comprises removing each of said additional compounds by the distillation of step (a).

5. The method as defined by claim 1 wherein said distillations of step (a) and step (c) are performed in a packed distillation column.

6. The method as defined by claim 5 wherein said distillations of steps (a) and (c) are low pressure steam distillations.

7. The method as defined by claim 1 further comprising the steps of:
    (d) measuring the pH of the distilled wastewater of step (c); and
    (e) varying the amount of aqueous soda ash solution added in the treatment of step (b) to maintain said pH at less than 9.0.

8. The method as defined by claim 7 wherein said pH is maintained at 8.5 to 9.0.

9. The method as defined by claim 8 wherein said pH is maintained at approximately 8.6–8.7.

10. The method as defined by claim 7 wherein said pH is automatically maintained at the desired level.

11. The method as defined by claim 7 wherein each of said distillations of steps (a) and (c) is a steam distillation and said method further comprises maintaining the inlet steam pressure to each of said distillations essentially constant.

12. The method as defined by claim 1 further comprising the step of biologically treating said wastewater of step (c) to further purify said wastewater.

13. A method of removing ammonia from a raw ammonia liquor, derived from a coal coking operation, containing free and fixed ammonia, said process comprising the steps of:
    (a) steam distilling said liquor in a packed column to remove said free ammonia;
    (b) treating said distilled liquor of step (a) with an 18–22% soda ash solution to decompose said fixed ammonia;
    (c) steam distilling said treated wastewater of step (b) in a packed column to remove said decomposed fixed ammonia;
    (d) measuring the pH of said treated wastewater of step (c);
    (e) maintaining the pH of said wastewater of step (d) below about 9.0; and
    (f) biologically treating said wastewater of step (e) to further purify said wastewater.

14. An apparatus for removing ammonia from a wastewater containing free and fixed ammonia, said apparatus comprising:
    (a) an ammonia still comprising a packed column for removing free and fixed ammonia, said still comprising a vapor outlet, an inlet through which wastewater is fed to said still and an outlet through which purified wastewater leaves said still;
    (b) a source of soda ash solution, said source comprising an 18–22% solution of soda ash;
    (c) means for feeding said soda ash solution from said source to said soda ash inlet in the fixed leg of said still to decompose said fixed ammonia, said means being connected to said source of soda ash solution.

15. The apparatus as defined by claim 14 wherein said ammonia still is a packed two stage distillation column.

16. The apparatus as defined by claim 15 further comprising means for measuring the pH of said wastewater after said fixed ammonia has been removed therefrom.

17. The apparatus as defined by claim 16 further comprising control means for varying the feed of said soda ash to said ammonia still, said control means being connected to said means for feeding said soda ash and being adapted to vary the amount of soda ash being fed to said ammonia still so as to maintain said pH below about 9.0.

18. The apparatus as defined by claim 17 wherein said source of soda ash solution comprises a soda ash dissolution tank comprising an 18–22% soda ash solution.

19. The apparatus as defined by claim 18 wherein said soda ash dissolution tank comprises a screw for conveying soda ash into said tank, a water inlet and a steam inlet.

20. The apparatus as defined by claim 19 further comprising automatic means connected to said control means for automatically varying the feeding of said soda ash to said still.

21. The apparatus as defined by claim 20 further comprising means for supplying steam to said still and wherein said automatic means is adapted to maintain the pressure of said steam supply constant.

22. The apparatus as defined by claim 21 further comprising means for biologically treating said purified wastewater, said means for biologically treating said purified wastewater being connected to the outlet of said still whereby said means for biologically treating said purified wastewater is in fluid communication with said still.

23. A method for removing ammonia, oils and low boiling aromatic compounds from a wastewater containing free and fixed ammonia, said process comprising the steps of:
    (a) distilling said wastewater to remove said free ammonia, oils and low boiling aromatic compounds;

(b) treating said wastewater of step (a) by adding an aqueous soda ash solution thereto to decompose said fixed ammonia;
(c) distilling said treated wastewater of step (b) to remove said fixed ammonia; and
(d) biologically treating said distilled wastewater of step (c).

24. A method for removing ammonia from a wastewater containing free and fixed ammonia said process comprising the steps of:
(a) distilling said wastewater to remove said free ammonia;
(b) treating said wastewater of step (a) by adding an 18-22% aqueous soda ash solution thereto to decompose said fixed ammonia; and
(c) steam distilling said treated wastewater of step (b) to remove said fixed ammonia while maintaining the steam pressure within said column substantially constant and varying the amount of soda ash solution added to maintain a constant pH in said treated wastewater during steam distillation thereof.

25. The method as defined by 24 comprising maintaining said steam pressure within said column at 4-7 psig.

26. An apparatus for removing ammonia from a wastewater containing free and fixed ammonia said apparatus comprising:
(a) an ammonia still comprising a free leg for removing free ammonia and a fixed leg for removing fixed ammonia from said wastewater, said still comprising a vapor outlet, an inlet adapted to receive said wastewater and an outlet out of which purified wastewater flows;
(b) a steam source, said source being connected to a steam inlet in said still to introduce steam therein for purposes of assisting in the removal of said free and fixed ammonia to produce a purified wastewater;
(c) means for maintaining a constant steam pressure within said free and fixed legs of said still, said means for maintaining said constant steam pressure being connected to said steam inlet;
(d) a source of 18-22% soda ash solution;
(e) means for feeding said soda ash solution from soda ash source to said fixed leg of said ammonia still to decompose said fixed ammonia, said means being connected to said source of soda ash solution;
(f) control means for controlling the amount of soda ash fed to said still;
(g) pH sensing means arranged at the outlet of said still to measure the pH of effluent leaving said still, said control means being connected to said pH sensing means to feed said soda ash solution to said still so as to maintain a constant pH in said wastewater during removal of said fixed ammonia; and
(h) means for biologically treating said purified wastewater, said means for biologically treating said purified wastewater being connected to the outlet of said still to receive said purified wastewater therefrom.

* * * * *